US010922981B2

(12) United States Patent
Mazor et al.

(10) Patent No.: US 10,922,981 B2
(45) Date of Patent: Feb. 16, 2021

(54) RISK EVENT IDENTIFICATION IN MARITIME DATA AND USAGE THEREOF

(71) Applicant: WINDWARD LTD., Tel Aviv (IL)

(72) Inventors: Yair Mazor, Givatayim (IL); Tomer Benyamini, Tel-Aviv (IL); Omid Rokni, Tel-Aviv (IL); Ido Sovran, Tel Aviv (IL); Yonit Hoffman, Herteliya (IL); Yaniv Meoded, Kfar Saba (IL); Rotem Abeles, Tel Aviv (IL); Ilan Atias, Kiryat Ono (IL); Maksim Bocharenko, Rishon Lezion (IL)

(73) Assignee: WINDWARD LTD., Tel Aviv (IL)

( * ) Notice: Subject to any disclaimer, the term of this patent is extended or adjusted under 35 U.S.C. 154(b) by 182 days.

(21) Appl. No.: 16/210,333

(22) Filed: Dec. 5, 2018

(65) Prior Publication Data

US 2020/0184828 A1 Jun. 11, 2020

(51) Int. Cl.
*G08G 3/02* (2006.01)
*B63B 43/18* (2006.01)
(Continued)

(52) U.S. Cl.
CPC ............... *G08G 3/02* (2013.01); *B63B 21/66* (2013.01); *B63B 43/18* (2013.01); *G06F 17/18* (2013.01);
(Continued)

(58) Field of Classification Search
CPC .......... G08G 3/02; B63B 43/18; B63B 21/66; B63B 79/40; B63B 79/30; B63B 79/20;
(Continued)

(56) References Cited

U.S. PATENT DOCUMENTS 6,469,664 B1 * 10/2002 Michaelson ........... G01C 21/00 342/357.31
6,734,808 B1 * 5/2004 Michaelson ........... G01C 21/22 340/984

(Continued)

OTHER PUBLICATIONS

International Search Report and Written Opinion of the International Searching Authority issued in corresponding International Application No. PCT/IL2019/050221, dated Jun. 4, 2019.

(Continued)

*Primary Examiner* — Rodney A Butler
(74) *Attorney, Agent, or Firm* — Birch, Stewart, Kolasch & Birch, LLP.

(57) ABSTRACT

An apparatus, method and computer readable medium, the method comprising: obtaining raw maritime data from a plurality of sources, the raw maritime data indicative of a geolocation of vessels at different times and comprises duplicative data obtained from separate sources; analyzing the raw maritime data to produce for each vessel a vessel story comprising a set of activities and corresponding timestamps, wherein the set of activities associated with each vessel is smaller by at least one order of magnitude than the raw maritime data associated with the each vessel; identifying a pattern in the vessel story associated with a vessel, wherein the pattern conforms with a risk event; and validating the risk event using the raw maritime data or vessel stories, whereby identifying the risk event using reduced resources than required to identify the risk event in the raw maritime data, and without increasing false positive metrics.

31 Claims, 4 Drawing Sheets

Figure 1:
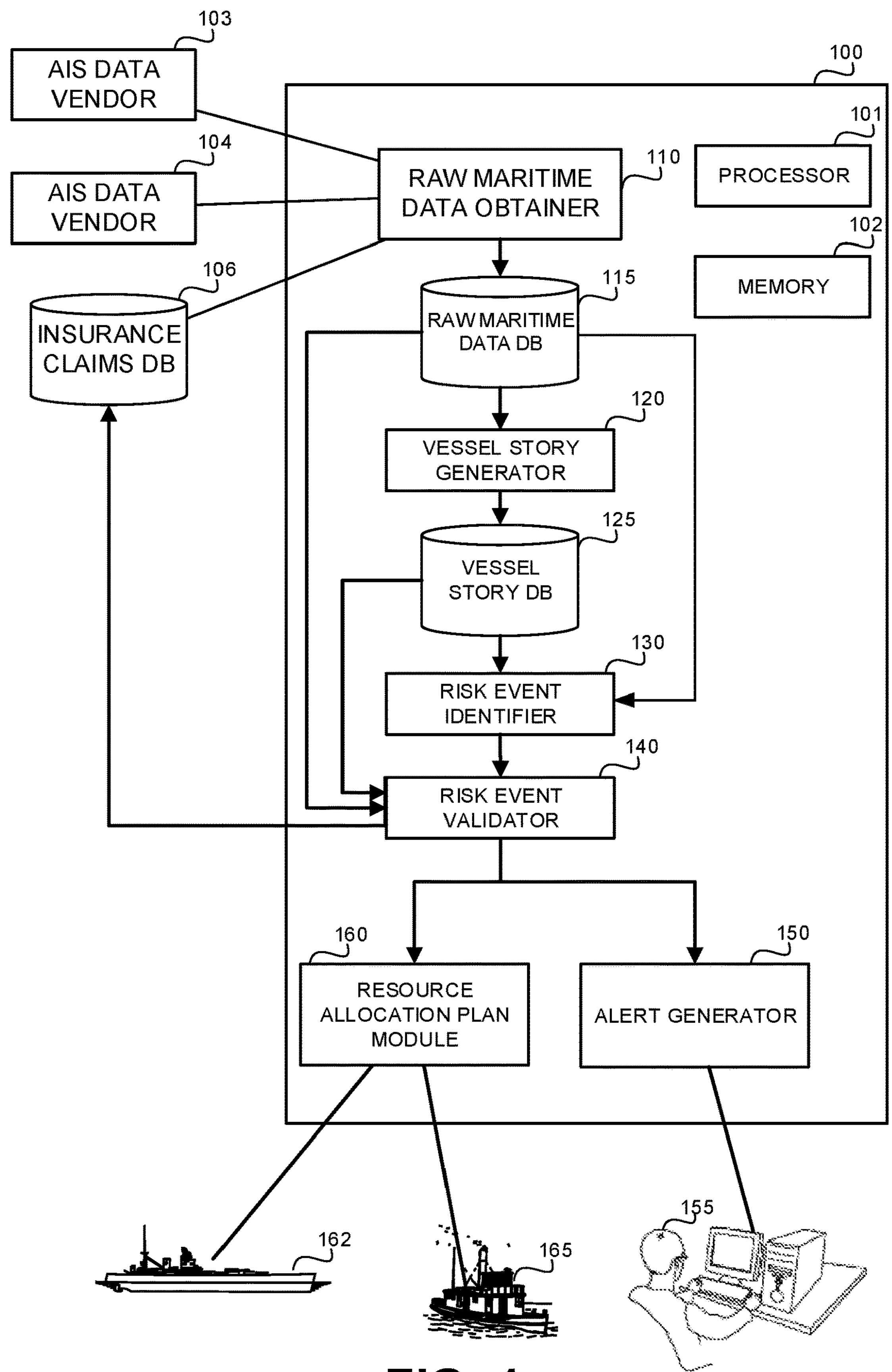

(51) Int. Cl.

| | |
|---|---|
| ***B63B 21/66*** | (2006.01) |
| ***G06F 17/18*** | (2006.01) |
| ***G07C 5/00*** | (2006.01) |
| ***H04W 4/02*** | (2018.01) |
| ***H04W 4/029*** | (2018.01) |

(52) U.S. Cl.
CPC ............. *G07C 5/006* (2013.01); *G07C 5/008* (2013.01); *H04W 4/029* (2018.02)

(58) Field of Classification Search
CPC ......... G06F 17/18; G07C 5/006; G07C 5/008; H04W 4/029
See application file for complete search history.

(56) References Cited

U.S. PATENT DOCUMENTS

| | | | | |
|---|---|---|---|---|
| 9,830,663 | B2 * | 11/2017 | Roberts | G06Q 40/08 |
| 10,572,809 | B1 * | 2/2020 | Schurmann | G01S 13/917 |
| 2009/0207020 | A1 * | 8/2009 | Garnier | G08B 21/12 340/541 |
| 2012/0316769 | A1 * | 12/2012 | Gagliardi | G08G 3/02 701/300 |
| 2013/0136156 | A1 * | 5/2013 | Salter | G06T 9/00 375/211 |
| 2015/0278734 | A1 * | 10/2015 | Grant | E21B 41/0092 705/7.23 |
| 2015/0350552 | A1 * | 12/2015 | Pryszo | G06T 11/206 348/143 |
| 2015/0369787 | A1 * | 12/2015 | Stuer-Lauridsen | G01N 33/18 702/22 |
| 2016/0001856 | A1 * | 1/2016 | Gentle | B63B 49/00 701/21 |
| 2020/0012283 | A1 * | 1/2020 | Nguyen | G05D 1/0206 |

OTHER PUBLICATIONS

Stróżyna et al., “A Dynamic Risk Assessment for Decision Support Systems in the Maritime Domain”, Studia Ekonomiczne, vol. 165, Dec. 31, 2015, pp. 295-307.

* cited by examiner

RISK EVENT IDENTIFICATION IN MARITIME DATA AND USAGE THEREOF

TECHNICAL FIELD

The present disclosure relates to data analysis in general, and to big data analysis of maritime-related data, in particular.

BACKGROUND

Vessel tracking may be achieved through the use of the Automatic Identification System (AIS).

Information provided by AIS equipment, such as identification, position, course, and speed, can be displayed on a screen or an Electronic Chart Display and Information System (ECDIS). AIS is intended to assist a vessel's watch-standing officers and allow maritime authorities to track and monitor vessel movements. AIS integrates a standardized VHF transceiver with a positioning system such as a GPS receiver, with other electronic navigation sensors, such as a gyrocompass or rate of turn indicator. Vessels fitted with AIS transceivers can be tracked by AIS base stations located along coast lines or, when out of range of terrestrial networks, through satellites that are fitted with AIS receivers.

AIS messages comprise an Maritime Mobile Service Identity (MMSI) number of the vessel that holds the transmitter. However, MMSI number is not a unique identifier and may be reused by different vessels. Because of this and other reasons, AIS data may be hard to decipher and utilize on a large scale basis. Similar issues exist with other information sources, such as, for example, VHF Data Exchange Systems (VDES).

BRIEF SUMMARY

One exemplary embodiment of the disclosed subject matter is an apparatus comprising: a memory, wherein said memory retaining raw maritime data, wherein the raw maritime data is indicative of a geolocation of vessels at different times, wherein the raw maritime data comprises duplicative data obtained from separate sources; a processor configured to: analyze the raw maritime data to produce for each vessel a vessel story, wherein the vessel story comprises a set of activities and corresponding timestamps, wherein the set of activities are deduced from the raw maritime data, wherein the set of activities associated with the each vessel is smaller by at least one order of magnitude than the raw maritime data associated with the each vessel; identify a pattern in the vessel story associated with a vessel, wherein the pattern conforms with a risk event; and validate the risk event using the raw maritime data or using one or more vessel stories; whereby identifying the risk event using reduced resources in comparison with resources required to identify the risk event in the raw maritime data, and without increasing false positive metrics.

Optionally, the raw maritime data is obtained from a plurality of sources, wherein the plurality of sources comprises a risk events data source, wherein said processor is further configured to update the risk events data source based on the validated risk event.

Optionally, the risk events data source is an insurance claims database, wherein said processor is further configured to obtain the risk event from the insurance claims database, wherein said identify the pattern and said validate the risk event are performed to validate the risk event appearing in the insurance claims database.

Optionally, said validating the risk event comprises: using validating data occurring after the risk event had occurred.

Optionally, the validating data comprises at least one of the following: one or more tugboats reaching the vessel and moving together with the vessel to a destination; a destination change to a location where the vessel can be repaired; a movement pattern conforming with repairing the vessel; and a multi-port route, wherein the multi-port route comprises visiting a port and a shipyard thereafter, wherein the port is closer to a location of the risk event than the shipyard.

Optionally, said validating the risk event comprises: using validating data occurring at a time of the risk event.

Optionally, the validating data comprises the vessel being located in a location where a depth is shallower than a draught of the vessel, wherein the draught of the vessel is determined based on the raw maritime data.

Optionally, the validating data comprises the vessel maintaining position at sea for a minimal time threshold.

Optionally, the raw maritime data does not indicate the vessel anchoring when maintaining position at sea.

Optionally, the validating data comprises a collision vector between the vessel and a second vessel.

Optionally, the validating data comprises an indication of a collision from the second vessel.

Optionally, the raw maritime data is exclusive of data for the vessel at a time of the risk event, whereby raw maritime data from before and after the risk event is utilized to identify the risk event.

Optionally, the processor is further configured to determine a resource allocation plan and send the resource allocation plan for execution, wherein the resource allocation plan comprises a plan to distribute maritime assets associated with risk events; whereby physical location of the maritime assets is changed.

Optionally, the raw maritime data is obtained from a plurality of sources, wherein the plurality of sources comprises a first Automatic Identification System (AIS) vendor and a second AIS vendor.

Optionally, the processor is further configured to compute a risk score for the vessel based on automatically determined risk events of the vessel.

Optionally, the raw maritime data comprises a first raw data and a second raw data, wherein the first and second raw data comprise an identifier of a same maritime object, wherein said processor is configured to match the first raw data with the vessel and the second raw data with a second vessel.

Optionally, said processor is further configured to compute, based on the vessel story of the vessel, a statistical measurement of maintenance stops performed by the vessel, wherein validating the risk event comprises identifying a maintenance stop occurring after the risk event and prior to an expected maintenance stop in view of the statistical measurement.

Another exemplary embodiment of the disclosed subject matter is a method comprising: obtaining raw maritime data from a plurality of sources, wherein the raw maritime data is indicative of a geolocation of vessels at different times, wherein the raw maritime data comprises duplicative data obtained from separate sources; analyzing the raw maritime data to produce for each vessel a vessel story, wherein the vessel story comprises a set of activities and corresponding timestamps, wherein the set of activities are deduced from the raw maritime data, wherein the set of activities associated with the each vessel is smaller by at least one order of magnitude than the raw maritime data associated with the each vessel; identifying a pattern in the vessel story associated with a vessel, wherein the pattern conforms with a risk event; and validating the risk event using the raw maritime data or one or more vessel stories; whereby identifying the risk event using reduced resources in comparison with resources required to identify the risk event in the raw maritime data without increasing false positive metrics.

Optionally, the raw maritime data is obtained from a plurality of sources, wherein the plurality of sources comprises an insurance claims database, wherein said method further comprises updating the insurance claims database based on the validated risk event.

Optionally, said validating the risk event comprises: using validating data occurring after the risk event had occurred, wherein the validating data comprises at least one of the following: one or more tugboats reaching the vessel and moving together with the vessel to a destination; a destination change to a location where the vessel can be repaired; a movement pattern conforming with repairing the vessel; and a multi-port route, wherein the multi-port route comprises visiting a port and a shipyard thereafter, wherein the port is closer to a location of the risk event than the shipyard.

Optionally, said validating the risk event comprises at least one of: identifying the vessel being located in a location where a depth is shallower than a draught of the vessel at a time of the risk event, wherein the draught of the vessel is determined based on the raw maritime data; identifying that the vessel maintaining position at sea for a minimal time threshold at a time of the risk event; identifying a collision vector between the vessel and a second vessel; and obtaining an indication of a collision from raw maritime data associated with the second vessel.

Optionally, the raw maritime data is exclusive of data for the vessel at a time of the risk event, whereby raw maritime data from before and after the risk event is utilized to identify the risk event.

Optionally, the method comprises: determining a resource allocation plan, wherein the resource allocation plan comprises a plan to distribute maritime assets associated with risk events; implementing the resource allocation plan, whereby physical location of the maritime assets is changed.

Optionally, the raw maritime data comprises a first raw data and a second raw data, wherein the first and second raw data comprise an identifier of a same maritime object, wherein said method comprises matching the first raw data with the vessel and matching the second raw data with a second vessel.

Optionally, the method comprises computing, based on the vessel story of the vessel, a statistical measurement of maintenance stops performed by the vessel, wherein said validating the risk event comprises identifying a maintenance stop occurring after the risk event and prior to an expected maintenance stop in view of the statistical measurement.

Yet another exemplary embodiment of the disclosed subject matter is a method comprising: obtaining raw maritime data from a plurality of sources, wherein the raw maritime data is indicative of a geolocation of vessels at different times, wherein the raw maritime data comprises duplicative data obtained from separate sources; analyzing the raw maritime data to produce for each vessel a vessel story, wherein the vessel story comprises a set of activities and corresponding timestamps, wherein the set of activities are deduced from the raw maritime data, wherein the set of activities associated with the each vessel is smaller by at least one order of magnitude than the raw maritime data associated with the each vessel; identifying a pattern in the vessel story associated with a first vessel, wherein the pattern conforms with a risk event; and validating the risk event using the vessel story associated with a second vessel, wherein the second vessel story is consistent with the risk event occurring to the first vessel; whereby identifying the risk event using reduced resources in comparison with resources required to identify the risk event in the raw maritime data without increasing false positive metrics.

Optionally, said validating comprises detecting a second vessel story consistent with a collision between the first vessel and the second vessel.

Optionally, said validating comprises detecting a second vessel story consistent with the second vessel towing the first vessel after the risk event occurred.

Optionally, according to the raw maritime data the first and the second vessel are located in proximity to one another at a time of the risk event or within a time window thereafter.

Optionally, said validating comprises: filtering from the plurality of vessels a subset of vessels, wherein the subset of vessels are vessels that at the time of the risk event or within a time window thereafter are located in proximity to the first vessel; examining vessel stories of each vessel in the subset of vessels to detect the second vessel, whereby checking consistency of vessel stories with the risk event occurring to the first vessel for a reduced number of vessels, whereby reducing computational resources required for said validating.

Yet another exemplary embodiment of the disclosed subject matter is a non-transitory computer readable medium retaining program instructions, which program instructions when read by a processor, cause the processor to perform a method comprising: obtaining raw maritime data from a plurality of sources, wherein the raw maritime data is indicative of a geolocation of vessels at different times, wherein the raw maritime data comprises duplicative data obtained from separate sources; analyzing the raw maritime data to produce for each vessel a vessel story, wherein the vessel story comprises a set of activities and corresponding timestamps, wherein the set of activities are deduced from the raw maritime data, wherein the set of activities associated with the each vessel is smaller by at least one order of magnitude than the raw maritime data associated with the each vessel; identifying a pattern in the vessel story associated with a vessel, wherein the pattern conforms with a risk event; and validating the risk event using the raw maritime data or one or more vessel stories; whereby identifying the risk event using reduced resources in comparison with resources required to identify the risk event in the raw maritime data without increasing false positive metrics.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a system, in accordance with some exemplary embodiments of the disclosed subject matter; and FIG. 2A-2F show flowchart diagrams of methods, in accordance with some exemplary embodiments of the disclosed subject matter.

DETAILED DESCRIPTION

In the present disclosure, a "vessel" is a term referring to an object of interest at sea. Vessels may include large ships, small ships, yachts, rafts, buoys, or the like. Although each vessel is separate and unique, the same vessel may emit transmission, such as AIS messages, identifying the vessel using one or more non-unique identifiers. The disclosed subject matter may maintain unique vessel identifiers as internal identifiers that are not used by other systems.

In the present disclosure, "raw maritime data" refers to raw data representing at least geolocation of vessels at timestamps. The raw maritime data may comprise raw data as received or may be manipulated such as by merging two messages into one, correcting one message based on additional data, or the like. The raw maritime data may be indicative of an exact route of the vessel, including its periodic location (e.g., every 10 seconds, every one minute, every 3 minutes, every 15 minutes, or the like). Based on the maritime data, a plot depicting movement of the vessel may be determined and potentially displayed on a map. In some exemplary embodiments, raw maritime data may comprise AIS messages of types 1-3, 18, 19, 27, or the like, which indicate geolocation of the transmitting vessel. Such messages may also be referred to as "AIS blips" or "blips" in short. It is noted, however, that the disclosed subject matter is not limited to AIS messages and may be implemented with respect to additional or alternative sources of raw maritime data.

In the present disclosure, a "vessel story" may be a temporal description of events of interest (or lack thereof) related to a vessel (generally referred to as activities). The vessel story may be a set of activities and corresponding timestamps. The vessel story may be a compact representation and abstraction of the raw maritime data or deductions based on such data. For example, a plurality of geolocations of the vessel every 15 minutes during a two day voyage, may be compacted and represented by a single TRAVELING activity. The TRAVELING activity may comprise properties, such as indicating start time, end time, general speed information (e.g., in a hurry, normal, economy travel, or the like), or the like. Such activity may be an abstraction of thousands of messages in the raw maritime data. The activities may represent a semantic understanding of what the vessel is doing and its interaction with its surrounding, such "loaded with cement", "experienced extreme weather", "detained by police", "waiting to enter port A", "loading/unloading in port B", "changing destination", "stopped transmitting for X hours", "traveling at sea depth X", "traveling at weather condition X", or the like. In some cases, the vessel story may be further based on other factors and additional data sources, such as time (e.g., for "stopped transmitting activity"), location of ports (e.g., for "entered port" activity), or the like. In some cases, some activities may rely on other activities, resulting in a hierarchy of activities. The representation may be "non-lossy" or "lossy" with respect to how much of the original information is retained in the compact representation. As an example, in case a vessel transmitted the same destination in 10 different messages in the last hour, this may be "compacted" to a single destination report associated with the time range of those messages, possibly indicating the total number of those messages (e.g. 10) or even their timestamps (if a non-lossy representation is required). In some cases, the vessel story may include several activities at the same time, also referred to as concurrent activities. In some cases, the concurrent activities may be alternative activities that may or may not co-exist. In some cases, alternative activities may contradict one another. In some cases, concurrent activities may be cumulative and co-exist. In some cases, each activity may be associated with a confidence measurement, indicating likelihood of the activity. Such measurement may be updated over time based on newly obtained information, so as to resolve conflicting concurrent activities.

One technical problem dealt with by the disclosed subject matter relates to gathering information relating to vessels. A few aspects of the challenges are specific to the multitude of maritime vessels around the world: they come in different types; have different owners and operators; serve different purposes that may even change over time; are bound to different regulations, policies, or national laws depending on the circumstances; and use different machinery, hardware, and software for communication purposes.

In addition, behavior of vessels may change over time due to local and global conditions, e.g. economic supply and demand of commodities, fuel consumption preferences, weather, dangers at sea, regulations, dynamic adaptations of routes at sea, changes in fish distribution, geopolitical events, and even melting icebergs. Some vessels (e.g. Floating Production Storage and Offloading, or a vessel decommissioned for some period) may behave like a floating buoy, some may appear to be onshore (e.g. for repairs in a shipyard), and some may change behavior over time depending on circumstances.

Furthermore, some information on vessels may be absent, duplicated, modified or otherwise corrupted due to non-malicious reasons, some may be absent, duplicated, modified or otherwise manipulated maliciously. For example, due to noise and other interferences with the physical layer, data may be corrupted. Additionally or alternatively, some malicious actors may make occasional efforts to provide false information, such as not to disclose part or all of vessel information or otherwise manipulate information (e.g. "fake" vessels where no real vessels exist, manipulation by military vessels, vessels reporting wrong information (e.g. identity, draught numbers, etc.) for various motives, vessels undergoing illegal activities such as illegal fishing, pirating, and drug trafficking, vessels not transmitting and so on).

In some exemplary embodiments, corrupted data, such as due to non-deliberate corruption or deliberate malicious intent, may reduce or increase the quantity of available data and adversely affect accuracy of any processing performed. In some cases, coping with noisy data may result in an increase of "false positive" indications and/or of "false negative" indications.

In addition, some maritime data may be received from different sources in a duplicative manner. For example, a single AIS message transmitted once by a vessel may be received by both a base station and a satellite. The duplicative messages may be obtained from different data providers that collect such data and provide it to their customers or clients. However, in some cases, the data, though duplicative, may not be identical. For example, some data providers may implement correction measures to correct corrupted data. Additionally or alternatively, some messages may be received in a corrupted manner e.g. due to physical effects in the analog signal. Additionally or alternatively, data providers may provide alternative subset of the fields of messages, rendering the same identical message to be represented differently.

In some cases, raw maritime data may appear to relate to the same vessel, while in actuality relating to different vessels. Such may be the case when the AIS message utilizes a non-unique MMSI identifier. In some cases, a default identifier, such as zero value (0) in the MMSI field may be utilized when the information is not manually set into the transmitting equipment (e.g. when the device is reset). Such identifiers may cause different messages to appear to be relating to the same vessel while in actuality they may be associated with separate vessels. The same may apply to other allegedly unique identifiers whose uniqueness is not necessarily enforced.

Additionally or alternatively, raw maritime data may appear to relate to different vessels, while in actuality relating to the same vessel, transmitting using different transmitters and using different identifiers in each transmission. Additionally or alternatively, raw maritime data may falsely appear to not relate to any vessel at all, such as in case special NULL value is used in the identifier.

Another technical problem dealt with by the disclosed subject matter relates to efficient analysis of the maritime data. As the raw maritime data may comprise literally millions of messages for each vessel, analysis thereof may be non-trivial and require substantive computation and memory resources. Taking into account the massive number of vessels, a prominent technical challenge in utilizing such data is to provide for a scalable computation that can mitigate the overall large volume of data. It is a further challenge to avoid increasing false positive rates, absolute number of false positives and other false positive metrics due to data loss when abstractions are utilized.

Another technical problem relates to the challenge of providing real-time analysis of the raw maritime data. In some exemplary embodiments, it may be desired to identify a risk event (as detailed below) as it occurs or as it is about to occur, and providing warnings to appropriate entities and authorities to circumvent the occurrence of the risk event or real-world consequences thereof. Approaches that require substantive computation and memory resources may not be feasible or applicable in real-time and indeed would not be considered an acceptable solution to such technological challenges.

Yet another technical challenge may be to identify risk events. A risk event may be an event indicating an activity that is associated with a risk to the vessel or a risk from the vessel to third-parties. For example, a risk event may be a collision event, in which the vessel may be damaged. A risk event may be grounding, where the vessel may get stuck and require assistance before it can continue on its journey. In some cases, grounding may cause a hull breach, cargo spill, or the like. Yet another risk event may be a risky activity taken by the crew of the vessel, such as drug trafficking or pirating. Such activity may be associated with potential inherent risk factors due to the criminal nature of the activity. In some exemplary embodiments, it may be desired to identify the risk event and associated prediction metrics, such as but not limited to confidence levels of the risk event, predicted risk impact, or the like. In some exemplary embodiments, the risk event may comprise effect size relating to the risk event. For example, in case of a collision event, the effect size may indicate the total amount of damage to the vessel or other third parties caused by the collision.

Yet another technical challenge may be to enable use of a risk events data source that retains information related to vessels such as based on insurance activities, media reports, or the like. Such information may be inaccurate, inconsistent, non-normalized, missing, duplicative, partial, or generally not validated on its own and may therefore include non-credible data. As an example, an insurance claims database, which comprises information that was not necessarily validated, may be utilized for enriching the raw maritime data obtained from other sources. An insurance claims database may indicate locations of vessels at specific times, partial identifying information on the vessels, potential risk events related to the vessels, and other metadata related to the vessels, risk events, as well as context (e.g. weather, conditions, time) and related parties (e.g. crew, building involved in a collision risk event, and more).

Yet another technical challenge may be decreasing the rate of false positive identifications of risk events, or bounding the absolute number of such false positives. False positive identifications of risk events may reduce the usability of an automated system for detecting risk events. Human users who may receive notifications of detected risk events may become inattentive to such detected events if the rate (or absolute number) of false positive is above some acceptable (low) threshold. However, reducing the statistical likelihood of false positives traditionally requires increasing available data used for the detection process, which in turn requires increase computational resources.

Yet another technical challenge may be to distribute maritime assets useful for mitigating risk events or damages caused thereby, in an optimal manner. Maritime assets may comprise, for example, tugboats that are set to assist vessels in grounding events and collisions. As another example, maritime assets may be weaponized vessels for coping with drug trafficking, pirating and other criminal activities. As yet another example, maritime assets may include floating shipyard or otherwise moveable maintenance facility.

One technical solution may be to pre-process raw maritime data and generate vessel stories based thereof. Using the vessel stories, potential risk events may be identified. It is noted that an activity in the vessel story may be determined based on dozens, hundreds, thousands and more messages in the raw maritime data. As a result the number of activities in all vessel stories may be smaller by at least one order of magnitude, and many times by two, three, four or even more ordered of magnitudes, than the number of all messages in the raw maritime data. As the vessel stories may comprise a substantially smaller volume of data than the raw maritime data, the computational complexity of the detection may be significantly reduced. For example, if instead of processing N messages in the raw maritime data, M activities in the vessel stories are analyzed, where $M \ll N$, then the computational complexity may be $O(M) \ll O(N)$, resulting in a significant reduction in computation requirement. In some cases, memory requirements may be similarly reduced. The reduction in resources requirements may be in one or more orders of magnitude. Moreover, in some scenarios, some technical approaches which would have otherwise be infeasible may become feasible due to such reduction in resources requirements.

In some exemplary embodiments, the use of abstractions of the raw maritime data messages may reduce the amount of data available for the risk event detection. Such reduction of data may potentially create false positive indications, where the risk event appears in the abstraction but not in the actual, raw maritime data (e.g., the abstraction is an over-approximation of the actual data). In some exemplary embodiments, the detected event may be validated using the raw maritime data. Using the raw maritime data to validate a detected event may be a task that requires less computational or memory resources than detecting the risk event in the raw maritime data to begin with. Additionally or alternatively, the added resources required for validation may be significantly smaller than those spared by detecting the risk event using the vessel story. In some cases, the reduction in required resources may enable real-time computation and analysis of the data to provide real-time insights thereof, which may be unavailable if the raw maritime data is analyzed directly.

In some exemplary embodiments, the risk event may comprise statistical significance and effect size. The validation of the risk event may validate the statistical significance and the effect size. In some cases, during validation different statistical significance or effect size may be determined, and the risk event may be modified accordingly.

Validation of a risk event may comprise computing statistical significance of the risk event and ensuring the statistical significance is above a minimal threshold, such as 50%, 60%, or the like. Additionally or alternatively, the validation of the risk event may comprise updating the risk event to include the statistical significance In some exemplary embodiments, validation of the risk event for one vessel, as identified in its vessel story, may be based on information regarding other vessels. For example, information, such as vessel stories or raw maritime data, regarding other vessels that may respond to the risk event, participate in it, or otherwise are effected thereby, may be used to validate that the risk event has indeed occurred. Consider, as an example, a grounding event. Tugboats may respond to the risk event and tow the grounded vessel. Such actions may be reflected in their vessel stories, and as a result, may be used to validate the grounding event of the vessel. As yet another example, a collision event may be identified for one vessel and validated based on the second vessel with which it collided. As yet another example, the collision event may be validated by an insurance claims database to which the second vessel or third party reported the collision. However, such an entry in the insurance claims database may not necessarily be taken at face value, and its credibility may be determined based on the actual behavior of the vessel, as indicated by the raw maritime data and/or the vessel story.

In some exemplary embodiments, validation of the risk event may be based on information regarding the same vessel at different time. As an example, a mooring incident may be validated by the vessel staying in its next port longer than expected. Such information about future actions may be used to validate in retrospect the risk event, when such data becomes available. As another example, an allision event, which indicates the vessel striking a stationary object, such as a building, may be validated based on a subsequent change of destination in journey to a shipyard.

In some exemplary embodiments, there may be a great number of vessels tracked by the system. Instead of processing each vessel as a potential vessel to validate the risk event, a pre-processing may be performed, where the vessels are filtered to determine a subset of vessels that were located in proximity of the vessel at the time the risk event had occurred or shortly before or thereafter (e.g., within one hour window, within a one day window, or the like). In some cases, the filtration may be performed by filtering any vessel that was not located at the relevant timeframe at the location of the risk event or within a perimeter thereof. For example, it may be determined which of the vessels were in a 3 km radius from the location of the risk event within the timeframe. In some exemplary embodiments, filtration may be performed using a spatiotemporal index. In some exemplary embodiments, the filtration may be performed using the raw maritime data and not using the vessel story, which may not necessarily provide the vessel's location at the relevant timeframe. Hence, instead of using the vessel story that comprises a reduced amount of data, the raw maritime data is used for the filtration, and the subset of vessels that were identified as potentially relevant are examined using their more compact representation of data, e.g., vessel stories.

In some exemplary embodiments, an insurance claims database may be used as a data source for a system in accordance with the disclosed subject matter. The insurance claims database may also be updated by the system, in a feedback loop manner, where the content of the database is enhanced using the disclosed subject matter. In some exemplary embodiments, entries in the claims database may be obtained and validated by detecting a pattern consistent with the claim in the vessel story and validating the risk event using raw maritime data or vessel stories of other vessels. Additionally or alternatively, the pattern consistent with the claim may be detected in the raw maritime data. An example for obtaining a suggested risk event directly from raw maritime data may include association of movements data to individual vessels, calculating estimated trajectories over time, interpolated and extrapolated, then together with "static" metadata information on vessels (e.g. their dimensions) efficiently (e.g. using spatio-temporal index) determine a collision risk event, as well as its significance and extent (e.g. estimated impact energy in collision).

In some exemplary embodiments, validation of the risk event may be based on events occurring after the risk event. Such post-factum events may be activity of tugboats, time schedule change (e.g. staying longer than expected in a certain port or location due to the risk event), destination change, destination change to a location where the vessel can be repaired, movement pattern consistent with vessel repair, multi-port route consistent with visiting a port for first-aid repairs and visiting a shipyard thereafter, or the like. In some exemplary embodiments, a vessel visiting a port of refuge (e.g., a port that is not on the vessel's itinerary) may be indicative of an unforeseen hazard at sea or other risk event.

In some exemplary embodiments, validation of the risk event may be based on events occurring prior to the risk event. Such prior events may indicate that the vessel had identified a potential risk and had tried to avoid it. In some cases, the vessel may not be able to avoid the risk event and it may still occur. As an example, a vessel may change its course in an attempt to avoid being caught within a storm. However, in some cases, the vessel may not be able to avoid the storm, and may suffer a risk event due to the storm.

In some exemplary embodiments, based on the vessel story, a statistical model based on maintenance stops performed by the vessel may be computed. The statistical model may be used to identify non-routine maintenance stops, such as maintenance stops that are performed in view of risk events. In some cases, using the statistical model, the statistical likelihood of the time between maintenance stops may be computed. Additionally or alternatively, standard deviation of an expected time may be computed. In view of the statistical model, it may be determined when a maintenance stop is performed prior to schedule. In some cases, a deviation larger than one standard deviation that occurs earlier than the expected time, may be viewed as a non-routine maintenance stop. In some cases, the route of the vessel may also be used in identifying the non-routine maintenance stops. For example, a maintenance stop may be performed earlier than expected due to a long voyage performed thereafter, and which prevented the vessel to performed the maintenance stop at a later time. Consider a vessel which performs a maintenance stop every 6 months, with a standard deviation of 2 weeks. The vessel may perform a maintenance stop after 5 months, which may be indicative of a non-routine maintenance stop. However, if the route of the vessel after the maintenance stop included a long voyage of 2 months in the Far East, away from the ports where the vessel routinely performs its maintenance stops, such a route may provide an alternative explanation for the early maintenance stop, which is not a non-routine maintenance stop. As can be appreciated from the above, the information may become available only long time after the potential risk event, or the examined maintenance stops have occurred. However, the disclosed subject matter may be utilized in retrospect to re-validate previous decisions or to analyze past behavior for the first time (e.g., detecting risk events for a vessel that occurred in the last 12 months).

In some exemplary embodiments, validation of the risk event may be based on events occurring at the time of the risk event. For example, the vessel remaining at the same location at sea (e.g. without anchoring) may be indicative of a grounding event. As another example, if the depth at the location of the vessel is shallower than the estimated draught of the vessel at that time, a grounding event may be validated. The draught may be extracted or computed from the raw maritime data. As yet another example, a collision vector of two vessels may be used to validate a collision event of the vessel.

It is noted that draught may be reported by the vessel, such as in an AIS message type 5 or 24. In some cases, however, the vessel may not report a correct draught information. For example, the crew may not bother to manually input the draught information until it is required (e.g., before entering an area that requires such reporting). In some cases, the vessel may maliciously report wrong draught information. The wrong information—lower or higher than actual draught—may be reported in order to adhere to some regulation, to conceal the cargo load, or otherwise provide false information regarding supply and demand at sea. The draught may be extracted or computed from the raw maritime data for that vessel, or in consideration of other data, e.g. the vessel's story and activities. For example, if a vessel was known to unload all its cargo in a certain port and since then was not known to have any opportunity to load any cargo or to otherwise change its real draught, and yet its raw maritime data reports a changed draught, that reported draught may be considered with lower confidence.

It is noted that the disclosed subject matter may also overcome the challenge of not having data regarding the vessel at the time of the risk event or within a predetermined range thereof. Maritime vessels, as opposed to cars, aircrafts, and other vehicles, are able to continue on their voyage without electricity, and without functioning instruments. Such may occur, for example, due to the risk event. For example, a collision event or a grounding event may cause a failure to the devices of the vessel, may cause a power failure, or the like. In some cases, the vessels may deliberately shut down instruments, such as the AIS equipment in order to avoid detection. As one example, consider a vessel on a drug trafficking voyage. During the voyage, the vessel may shut off its instruments to avoid detection. Regardless of the reason for the lack of data, the disclosed subject matter may overcome such difficulties. For example, the analysis may be based on the vessel story which does not require an exact plot and may be computed even when there are significant gaps in the raw maritime data relating to the vessel. Raw maritime data from before and after the risk event may be utilized to identify the risk event itself, in spite of not having raw maritime data at the time of the risk event itself and at near times. The analysis may also be based on vessel stories and raw maritime data of other vessels, as well as overall transmission coverage analysis and monitoring in order to overcome such difficulties and reduce the number of false positive event identifications (e.g. falsely suspecting a vessel had maliciously stopped transmitting). For example, if other vessels near that location and time continued transmitting, a certain vessel that stopped transmission would raise suspicion, while less so if that certain area is known at that certain time to have certain coverage issues, e.g. not receiving transmissions of many vessels, even though analysis has expected them to be transmitting from that certain area at that certain time.

In some exemplary embodiments, the raw maritime data may be obtained from a plurality of sources. The plurality of sources may comprise different AIS vendors, which may process the same AIS messages, and provide different variations thereof. In addition, different vessels may be identified by the same MMSI identifier, IMO, name, call sign, or other supposedly unique identifiers in the AIS data. It is noted that the above is exemplified using the AIS protocol, however, the disclosed subject matter is not limited to such protocol and may process messages in additional or alternative protocols. The raw maritime data may be processed to fuse different messages together, to match different messages to different vessels, although the message may indicate that they are associated with the same maritime object. After such processing is performed, the vessel stories may be generated based on the corrected raw maritime data. In some exemplary embodiments, if raw maritime data associated with a vessel cannot be associated with an activity (e.g., a classifier identifying an activity provides a predicted activity with a confidence level below a threshold; the classifier being unable to provide a predicted activity; or the like), the relevant portion of raw maritime data may be re-processed for matching with different vessels, for providing alternative correction measurements to the data, or the like. After such re-processing is performed, the activity may be determined. Such re-processing may be performed only to a relatively small portion of the raw maritime data, which poses potentially hard computation tasks. As the portion is relatively small, the amount of resources used therefore may be limited. In some exemplary embodiments, the re-processing may employ processing using a second processing module which utilizes increased computational resources in comparison to the computational resources utilized by the first processing module, which was initially used.

In some exemplary embodiments, the disclosed subject matter may be utilized to identify risk events of different vessels, such as vessels of a same fleet, or all vessels, so as to determine an optimal allocation of maritime assets to be used to mitigate the risk from the risk events. Each risk event may be associated with significance metrics (e.g. how likely the event is to occur), effect size metrics (e.g. estimated magnitude or importance of the risk or its consequences), or the like. The maritime assets may be, for example, tugboats, for mitigating the risk of damages from grounding events and collisions. As another example, the maritime assets may be a fleet of coast guard ships deployed to mitigate the risk from drug trafficking. Based on the identified risk events, an optimization problem may be generated and solved. The optimization problem may be a problem of minimizing the distance between a closest maritime asset to a risk event. Additionally or alternatively, the problem may be a minimization of the distance between the closest unoccupied maritime asset and the risk event. Additionally or alternatively, the problem may be a minimization of the distance while taking into account other metrics, such as by multiplying the effect size by the distance to the event. In some cases, the optimization problem may be a minimization of adverse effect of the risk events, where the adverse effect may increase over time if no asset reaches the vessel. In such a case, the minimization may provide for an available asset to be located near by in areas where there are collisions, but not where there are engine failures which do not require speedy reaction by the coast guard. The optimization problem may comprise constraints on the location of the maritime assets, such as maritime assets being located in ports. The optimization problem may be solved, and a resource allocation plan may be determined. The resource allocation plan may be implemented and the maritime assets may be moved to the location defined by the resource allocation plan. Data related to the implementation of the resource allocation plan may be fed into the analysis in a feedback loop to allow machine learning algorithms to perform better in future tasks.

In some exemplary embodiments, a statistical prediction model may be computed based on the raw maritime data, the vessel stories, the identified risk events, or the like. The statistical prediction model may be utilized in predicting risk events, predicting statistical metrics thereof (e.g., significance, effect size), or the like. Predicted risk events may be utilized in conjunction with any of the other aspects of the disclosed subject matter. As an example, the predicted risk events may be utilized for generating the optimization problem so that the solution may be applicable to predicted risk events. As another example, the prediction model may be utilized in assessing an expected damage caused by a vessel that can be utilized by insurance companies to estimate overall potential damage of an insured vessel or fleet. In some cases, such expected damage may be a basis for setting a price of an insurance policy.

One technical effect of the disclosed subject matter may be providing automated risk event identification and validation, using relatively reduced amount of computational resources and in an accurate manner. The disclosed subject matter may scale over large datasets, as is the case of raw maritime data, which comprises duplicative messages, large volume of messages per vessel, as well as many vessels and other complementary databases.

The disclosed subject matter may further be used to improve risk analysis of vessels, based on their actual operation and behavior. Additionally or alternatively, input sources to a system in accordance with the disclosed subject matter, such as insurance claims databases, may be enhanced to ensure improved quality of their datasets based on observed behavior, as extrapolated from the raw maritime data.

Another technical effect may be mitigating the risk from risk events, by improved allocation of maritime assets that are used to react when such events occur, so as to reduce the damage or other risk therefrom.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing a system, in accordance with some exemplary embodiments of the disclosed subject matter.

System 100 may be a computerized system comprising a Processor 101 and Memory 102. In some exemplary embodiments, Processor 101 may be a Central Processing Unit (CPU), a microprocessor, an electronic circuit, an Integrated Circuit (IC) or the like. Processor 101 may be utilized to perform computations required by the System 100 or any of it subcomponents. In some exemplary embodiments, Memory 102 may be a hard disk drive, a Flash disk, a Random Access Memory (RAM), a memory chip, or the like. In some exemplary embodiments, Memory 102 may retain program code operative to cause the Processor 101 to perform acts associated with any of the subcomponents of System 100. Additionally or alternatively, Memory 102 may be used to retain databases, such as 115, 125, or the like. Memory 102 may be used to retain raw maritime data, vessel stories, computed risk events, computed risk scores, or the like.

A Raw Maritime Data Obtainer 110 may be configured to obtain the raw maritime data. In some exemplary embodiments, the raw maritime data may be obtained from a plurality of different sources. In some cases, the sources may be, for example, data vendors, such as AIS data vendors 103, 104. The sources may be external databases, such as an Insurance Claims Database 106 or another risk events data source. The raw maritime data may comprise a geolocation and a timestamp with respect to a maritime object. For example, AIS data vendor may provide AIS blips received by its base stations, satellites and other mobile or stationary receivers. The Insurance Claims Database 106 may indicate the location of a vessel at a specific time when an event occurred.

In some exemplary embodiments, the raw maritime data may comprise duplicative data, such as a same AIS blip may be provided by two vendors. In some cases, different variations of the same AIS blip may be provided by different vendors, such as each vendor may provide a different subset of the fields of the AIS blip, the same AIS blip may be corrupted differently by the different vendors, the same corrupted AIS blip may be corrected differently by different vendors, or the like.

In some cases, the raw maritime data may comprise records allegedly associated to the same maritime object, such as indicated by a same identifier, but in actuality be associated with different vessels. For example, the same MMSI number may be used by different vessels and therefore may be mismatched to the same maritime object. As another example, a default value or other routinely selected value, such as value zero (0) for MMSI identifier, may be used by many AIS transmitters, such as in case the transmitter was not provided with another non-default value. In some cases, the raw maritime data may comprise records of the same maritime object but with different identifiers. For example, the same vessel may transmit messages with different MMSI identifiers. In some cases, this may be as a result of different transmitters, each transmitting a different identifier. As another example, this may be as a result of changing the settings of a transmitters to transmit different identifiers. In some exemplary embodiments, Raw Maritime Data Obtainer 110 may be configured to process the raw maritime data, correct it, fuse different records into a single record, match different records to different vessels, or the like. The raw maritime data obtained and produced by Obtainer 110 may be retained in a database, such as Raw Maritime Database 115.

In some exemplary embodiments, a Vessel Story Generator 120 may be configured to process the Raw Maritime Data DB 115 to produce vessel stories. As explained above, a vessel story may be a temporal description of activities related to a vessel. The vessel story may serve as a compact representation and abstraction of the raw maritime data or deductions based on such data. For each vessel, a vessel story may be produced. The vessel story may summarize semantical meaning of raw maritime data relating to the vessel, potentially also in relation to other sources of data.

The following is non-limiting examples of activities in vessel stories:

1. Waiting to get into a port activity. This activity may represent a case where the vessel is close to a port and waits outside (e.g. in a port waiting area). The activity may comprise metadata, such as a time when the activity started, a duration of time waiting, a port in which the vessel waits.

2. In a port activity. Such activity may indicate that the vessel is at a port. The activity may comprise information that may be determined based on the location of the vessel about a pier, wharf, dock, jetty, or the like (generally referred to as "pier"), the cargo that was loaded/unloaded (e.g., when certain piers are relevant for certain types of goods), from port information which may be available as an additional data source (not shown), or the like. In some exemplary embodiments, there may different in a port activities, such as a loading activity, an unloading activity, a refilling activity, an anchoring at pier activity, a maintenance activity, a repair activity, or the like. In some cases, the activity may comprise additional information such as port complexity to navigate in, speed and turn speed in port, whether navigation is done using a pilot vessel, or the like. The term port is used herein for convenience. In some exemplary embodiments, the term port may refer to a general location where such activities may take place, e.g. a maintenance activity in a floating shipyard or otherwise moveable maintenance facility, or meeting with a second vessel in a general location in the seas, followed by loading/unloading cargo activities between the two vessels.

In some exemplary embodiments, a loading activity may comprise metadata such as volume, amount or similar measurement of loaded goods, type of goods, value of loaded goods, how long the cargo was waiting at the dock, is the cargo dry cargo that may be ruined by weather conditions, or the like. Such information may be obtained from a system of an agent (not shown), from boat or other database, bills of ladings, customs or borders reports, port call reports. In some cases, the information may be extrapolated based on past information, from the change in draught of the vessel, based on the pier at which the vessel was located, based on sensed activity near the vessel (e.g., images of containers being loaded onto the vessel). In some cases, information may be validated in hindsight after processing future information, i.e. information about events that occurred in a later point in time after the loading activity. For example, information obtained regarding an unloading activity may be used to extrapolate and determine information about a corresponding loading activity, in hindsight, as well as information related to the location (e.g. port) where the corresponding loading activity took place.

In some exemplary embodiments, an unloading activity may comprise metadata such as volume, amount or similar measurement of the unloaded goods, type of goods, value of unloaded goods, or the like. Such information may be obtained from other data sources, based on the pier, change in draught, business or financial transactions, bills of ladings, customs or borders reports, port call reports, or the like.

In some exemplary embodiments, refueling activity may comprise metadata such as refueled volume, type of petrol refueled, cost, or the like. Such information may be obtained from external data sources, such as public records, agent information, change in draught, electronic billing or invoice received from the petrol supplier, fueling time together with throughput, or the like.

In some exemplary embodiments, anchoring in a pier activity may comprise metadata such as pier information, anchoring time, associated costs, or the like. Such information may be obtained from the raw maritime data, known locations of piers, images, external data sources such as port database, or the like.

In some exemplary embodiments, a maintenance activity may be determined based on the raw maritime data, such as blips navigation status, the vessel stopping transmitting new blips when located at a location where maintenance can be performed, location of the vessel, personnel on vessel, external data sources, such as agent system, database of the owner, insurance claims database, or the like. In some exemplary embodiments, maintenance activity may be planned maintenance activity, according to regular or expected maintenance schedule of the vessel. Additionally or alternatively, the maintenance activity may be an unplanned maintenance activity that is performed due to an unexpected event, such as a risk event.

In some exemplary embodiments, a repair activity may be determined based on the navigation status in the blips, based on shipyard data, owner data, location of the vessel being located at a shipyard, location of the vessel being located outside of the water or waters of relatively low depth, or the like.

In some exemplary embodiments, an anchoring at sea activity may be determined, such as based on blips, port database, or the like. The anchoring at sea may be an activity where the vessel is anchoring near the port and not in one of its piers. Additionally or alternatively, anchoring at sea activity may be an activity where the vessel is at sea and not in proximity of any port, but stands relatively still (e.g., location remains stationary or bounded or having about 1%, 2%, 5% change over a predetermined timeframe, such as ten minutes, half an hour, or the like; speed remains below a minimal threshold, such as below 5 km/h, for a predetermined timeframe; or the like).

A getting out of port activity may be determined based on blips in the raw maritime data, based on port database that is used as additional data source, data on other vessels, or the like.

Traveling from A to B activity may be determined. The activity may be determined based on the vessel being in location A at a first time, being in location B at a later time, based on the vessel type, the load, or the like. Speed patterns may be calculated for the entire route to determine whether the journey is at normal or abnormal conditions, such as "in a hurry" (e.g., compared to normal traveling and vessel capability), "normal", "economy", or the like. In some exemplary embodiments, the activity may be determined before the vessel reaches location B, or before obtaining the raw maritime data comprising blips indicating the vessel reached location B. For example, designated destination may be announced by the vessel, designated destination may be determined based on a partial route by projected expected continuation of the partial route, or the like. In some exemplary embodiments, the designated destination may be determined with a confidence measurement indicated the estimated probability of the prediction being correct. When the confidence measurement is above a threshold, the activity may be set. In some exemplary embodiments, the activity may be validated later, when additional data is received indicating whether the vessel reached its destination or not.

In some exemplary embodiments, a vessel may change its destination during its journey. The vessel may report this change of destination. Additionally or alternatively, the change of destination may be observed in the raw maritime data, such as by a sharp turn of the vessel, by changing course that is inconsistent with previous route taken, or the like.

In some exemplary embodiments, fishing activity may be determined, such as based on the type of vessel that is consistent with fishing, based on the location of the vessel in a fishing area, based on the vessel remaining in the fishing area for a time consistent with fishing, based on the vessel's movement pattern being consistent with fishing, based on the speed patterns of the vessel, or the like. In some exemplary embodiments, the vessel may explicitly report its activity as fishing. Additionally or alternatively, it may be possible to estimate what type of fish the vessel is fishing, given one or more movement patterns of the vessel, the vessel class, the location, the time of year, or the like, as well as information related to other vessels. Additionally or alternatively, it may be estimated how much fish was captured (e.g., based on fishing time and estimated amount of fish in the fishing location, based on the draught, or the like), quality of the fish, or the like. In some exemplary embodiments, some fishing techniques are done with multiple ships, recognizing cooperation—for example for "pair trawling" in which one sees the ships move in tandem and can even guess the direction regarding the current.

In some exemplary embodiments, a joining another vessel activity may be determined. The activity may be determined based on the locations of the vessels, the vessels' types, or the like. Such activity may indicate cooperation of the two vessels, moving contrabands, drug trafficking, or the like. The motivation of the vessels may be evaluated and in some cases, the metadata of the activity may indicate the rendezvous location and time, the motivation, or the like. The motivation may be, for example, to fuel—for fuel as merchandise; to transfer fish—when one has fish and the other is a processing ship, for example; to transfer goods or products, such as to reduce the boat draught as the port is too shallow; to transfer people such as guards, workers and pilots; to perform an illegal activity—drugs, weapons, people smuggling, and transferring legal merchandize in illegal ways; or the like. Sometimes such activity can be determined due to additional information and analysis. For example, one vessel stops transmitting, but the time it took to travel from X to Y, is proportional to the travel time and to expected time of joining another vessel. Such may be indicative of such an activity, even in the absence of relevant blips in the raw maritime data. In some cases, knowledge of another vessel in the area and potentially a location where that vessel stopped, may also be useful in estimating such an activity without complete data. Additionally or alternatively, joining another vessel activity can be performed with respect to a ghost vessel that does not transmit. For example, the movement pattern of the vessel may conform with joining another vessel even though no other vessel is reported nearby. In some cases, additional data sources, such as satellite imagery, may be used to validate the existence of the non-transmitting, ghost vessel.

In some exemplary embodiments, an abnormal travel activity may be determined. Such activity may be determined based on taking turns, not going straight to the destination, stopping, or the like. The reasons for such activity may be numerous, for example, to avoid inspection, to slow down delivery, to join a vessel (which may or may not report its location using the AIS system), smuggling (which may be indicated by identifying that the vessel stopped in a place that not a pier, leaving a destination without visiting a port, or the like), or the like. Change of destination, stopping in a place that is open sea without a valid explanation may be indicative of such an activity. In some exemplary embodiments, the abnormal travel activity may be caused due to sinking, vessel being under attack, a collision event, a grounding event, or the like. Alternatively, the vessel may exhibit abnormal behavior due to changes in other conditions, e.g. expected port congestions, expected or unexpected changes in weather (so the vessel is undertaking measures against such risks, resulting in "responsible" yet abnormal behaviors). Additionally or alternatively, uneconomic behavior, such as starting a journey to sea and returning to the same port without performing an activity, uneconomic route which requires excessive fuel consumption, or the like, may be identified and flagged as an abnormal travel activity.

A maintenance event may be determined. In some exemplary embodiments, a scheduled maintenance event may be determined based on the blips of the vessel, the location being in a shipyard or location where maintenance is performed, data from an external source, such as the shipyard, the schedule of the ship, or the like. In some cases, a unscheduled repair maintenance event may be determined based on the blips of the vessel, the location being in a shipyard or location where maintenance is performed, ship schedule, movement pattern prior to the event or thereafter, such as slow travel prior to reaching the shipyard and fast travel when leaving the shipyard, or the like. In some cases, an expected time between scheduled maintenance may be computed. A maintenance that is performed prior to the expected time, and representing a meaningful deviation therefrom, such as over one standard deviation from the expected time or deviating from norm represented using another statistical metric, may be indicative of the maintenance being a repair and not a scheduled maintenance.

In some exemplary embodiments, an activity may represent performing a service, such as servicing another vessel, servicing an oil rig, or the like.

In some exemplary embodiments, an activity may be a misleading blips activity. Such activity may be a catchall for information created by the vessels that is determined to be misleading data. In some cases, it may be determined that the vessel is sending misleading data without having knowledge of in what way it is misleading, but the fact the ship is misleading may be of interest and may be registered as part of the vessel story. In some exemplary embodiments, the activity may be identified when a vessel stopped transmitted while at sea, when the vessel started transmitted at sea, when the vessel changed its name or another identifier during a journey in a non-expected manner or not according to regulations, or the like.

Additionally or alternatively, the vessel story may comprise an activity representing "lazy operational behavior". A lazy operational behavior activity may indicate a vessel transmitted wrong information not in order to mislead someone. For example, AIS blips may have wrong or not up-to-date information on the destination, draught and many other things because they require consistent and accurate manual input, which may not have been provided by the crew. This is not necessarily misleading but may just be carelessness. Such carelessness may be recorded as part of the vessel story when it occurs in an aggregated manner. Additionally or alternatively, the carelessness may be recorded as part of the vessel story when it occurs for each type of carelessness in an aggregated manner.

In some exemplary embodiments, an activity may represent a change in parameters, ownership, operator, country, type of loads, refrigeration, or the like. In some cases, based on the ownership of the vessel, likelihood of suspicious activity to be performed may be determined. For example, some ship owners may operate ships in an illegal manner. As another example, if the owner is a shell company or a fake company, such may raise a flag that can be taken into account in determining other activities. As yet another example, single vessel companies may represent higher risk for risk events than companies owning a fleet of vessels. As yet another example, occurrences of risk events in other vessels of a ship owner may be indicative of likelihood for an occurrence of risk events in the vessel. As an example, consider that an owner makes sub-investments in her vessels. It is likely that risk events will occur in her ships in a higher frequency than other vessels who do not suffer from sub-investments.

Additionally or alternatively, some specific activities of meeting with other vessel may be determined. For example, the meeting may be in order to transfer cargo, for performing lightering (e.g., when a large vessel is next to the port and a smaller vessel takes the cargo to the port, often multiple meetings), for performing topup (e.g., when a large vessel is located next to the port, and multiple smaller vessels load cargo thereto), for moving fish, for refueling, or the like.

As can be appreciated, an activity may be a compact representation of a large volume of raw maritime data (e.g., blips). Hundreds, thousands of blips or more may be represented in a summarized manner by a single activity. In some exemplary embodiments, a mapping may exist between the activity and the raw maritime data on which it is based, such as for re-calculation purposes, debugging purposes, or the like. Re-calculation may be required when certain data is changed or updated. For example, some AIS data may be provided after the activity was already determined, completing the information about the exact location of the vessel at times in which previously the data was unavailable. After such additional data is provided, the activity may be validated against the new data, re-computed based on the new and old data, or the like.

In some exemplary embodiments, raw maritime data may be analyzed to determine the activities. In some exemplary embodiments, repetitive process may be performed where already inferred activities may also be processed in order to determine additional activities of the same vessel or of other vessels. In some exemplary embodiments, the determination may be associated with assigning or updating confidence measurements, indicating the estimated probability of the determination being correct (e.g. statistical significance), as well as the "effect size" or impact of the activity, where applicable. Additionally or alternatively, the activity may comprise an explanation as to why the activity was inferred. Such explanation may be useful for debugging or for manual evaluation by an analyst. In some cases, some of the metadata may remain empty, such as the reason of two vessels meeting each other. The information may be completed manually upon review, or automatically upon receiving additional data from which the metadata may be extrapolated or otherwise obtained.

The following are non-limiting examples of scenarios where activities can be determined.

Example (1)

Consider a vessel with raw maritime data as follows: the data indicates the vessel arrived to an area outside a port, the vessel awaits outside the port for a time duration above one hour, the vessel goes into the port. In some exemplary embodiments, if a vessel stays for more than an hour in the waiting area outside the port, and prior to that the vessel was further from the port (e.g., it arrived to the waiting area from an external location), and after waiting in the waiting area, the vessel entered the port, it may be automatically deduced that the activity of "waiting to get into port" had occurred between the time reaching the waiting area and the time entering the port. This example exemplifies how the activity can be deduced from the blips or other location data. Based on port records, there may be an alternative manner to automatically identify the activity or validate it.

Example (2)

Consider a vessel with the following timeline: the vessel arrived from somewhere to the area outside the port, the vessel is located in an anchoring area outside the port, the vessel then leaves the area of the port. The vessel may have never reported being in the port during the above timeline. Such a timeline may be used to automatically deduce that the vessel had anchored at sea. Additionally or alternatively, lack of change in the draught of the vessel may reinforce such deduction. In some exemplary embodiments, the automatic determination of the activity may require a minimal amount of time being located at the anchoring location (e.g., at least five hours). Additionally or alternatively, it may be required that prior to reaching the area of the port, the vessel was located further therefrom, and after the potential activity is concluded, the vessel leaves the area of the port and is located further therefrom.

Example (3)

Consider the following timeline. The vessel left point X and later moved to point Y and between them there were no points of interest. In such a case, the activity "traveling from X to Y" may be created. In some exemplary embodiments, the vessel may have left point X and may have been reported to perform "getting out of port" activity. The activity of reaching point Y may be waiting to enter port. In such a case, and if no additional activities were determined in between the first activity at X and the second activity at Y, an activity of "traveling from X to Y" may be created. As can be appreciated, the activity is determined based on other determined activities and absence of additional activities in-between. As this is the case, the activity may be determined only after an initial generation of activities is performed. In some exemplary embodiments, the metadata of the generated activity may be determined, such as the speed being determined as the distance between the locations divided by the elapsed time. In some cases, the distance may be aerial distance, average observed maritime distance, distance of predicted route taken (as learned from that vessel or other vessels in different times), or the like.

Example (4)

whenever an activity is calculated or data is cleaned or validated, anomalies may be discovered. For example, the blips may indicate that the vessel is in a particular place, but other data sources may render this unlikely. This could be because the place is land, or the ship could not get there from the previous location, or this contradicts other sources, e.g. a port record. It could also be that the ship is departing a port but does not report it, or that it simply stopped transmitting.

In such cases a misleading activity or a lazy operational behavior activity may be created and added to the vessel story. Consider the following example: the vessel was in the port but the AIS data does not indicate it. An activity of lazy operational behavior, indicating that the AIS system was closed at port, may be generated and added to the vessel story. As another example, after the ship is loaded, if the draught report is indicated as minimal, such a mismatch may be indicative of a lazy operational behavior activity. In some cases, this could be a deception activity, as may be determined in view of the actions of the vessel after leaving the port. In such a case, the activity may be modified to a misleading activity, or alternatively both a misleading activity as well as lazy operational behavior activity could be determined at that time with associated confidence metrics, which will be updated as more data is analyzed.

Example (5)

Consider the activity of a name change at sea. In order to deduce such activity for a vessel, a first activity of a ship A stopped transmitted at location X and a second activity of a ship B (with that changed name) started transmitting at location X may be determined and used to generate the name change activity. In some cases, the two activities may be at different locations where the distance therebetween is consistent with the travel time of that single vessel. Additionally or alternatively, it may be verified that both ship A and ship B have the same characteristics, such as type of vessel, draught information, or the like.

In some exemplary embodiments, Vessel Story Generator 120 may create the activities, and then, for every vessel, the raw data is transformed into a vessel story that is retained in Vessel Story Database 125. A Vessel Story User Interface (not shown) may graphically display the path of the vessel. On it, the vessel story may be presented by showing places where the ship stopped or performed activities. A log display of the vessel story may be presented showing the vessel story in a text format such as, for example:

2016-01-06 12:00 Started waiting to enter port X
2016-01-07 14:45 entered port X pier Y
2016-01-07 15:30-19:50 loaded 15 tons of Iron
2016-01-07 22:30 Leaving port X
2016-01-08 10:45 Started going from port X to port Y going at normal speed (may be calculated or updated in retrospect)
2016-01-08 Mismatch data, ship speed indicator in the AIS is unlikely
2016-01-20 10:45 Started waiting to enter port Y Risk Event Identifier 130 may be configured to analyze vessel stories to identify patterns that conform to risk events. As a compact representation of the data—the vessel story—is utilized, the detection may require substantial reduced computational resources. However, there may be false positive identifications of risk events based on the vessel story. A Risk Event Validator 140 may be configured to validate the risk event, and thereby reduce the chances of a false positive indication.

In some exemplary embodiments, Risk Event Identifier 130 may analyze the vessel stories in conjunction with some raw maritime data to identify the patterns that conform to risk events and to determine the details of the risk event. In some cases, the analysis may be focused on the vessel stories to reduce computational complexity of the processing, but may incorporate portions of the raw maritime data in determining the risk event. For example, the vessel stories may be analyzed to identify a potential collision between two vessels at a specific timeframe. The Risk Event Identifier 130 may analyze the raw maritime data of the two vessels at the specific timeframe to determine the existence of the risk event and determine its specific metadata.

In some exemplary embodiments, Risk Event Validator 140 may be configured to validate the risk event using raw maritime data from Raw Maritime Data DB 115. Additionally or alternatively, risk events may be validated using information from risk events data sources, such as Insurance Claims Database 106.

In some exemplary embodiments, the validation may be based on validating data that occurred after the risk event had occurred. In some exemplary embodiments, the validating data may comprise information about one or more tugboats traveling to the vessel, and after reaching the vessel, moving in tandem therewith, as is the case when the tugboat tows the vessel. In some cases, the tugboats may return to the same port from which they sailed. Additionally or alternatively, the tugboats may reach a location that can be used for performing first-aid repairs, complete repairs, or the like.

Additionally or alternatively, the validation data may comprise a destination change performed by the vessel to a different location, where it can be repaired. Such a change—and specifically, if the vessel acted upon it and reached the new location—may be indicative that urgent repairs were required due to some risk event.

Additionally or alternatively, the validation data may comprise movement pattern conforming with repairing the vessel, such as sailing to a shipyard at slow speed, leaving the shipyard at a faster speed, being located on ground (e.g., in the shipyard), or the like.

Additionally or alternatively, the validation data may comprise a multi-port route that comprises first visiting a nearby port and then visiting a more distant shipyard. Such multi-port route may be consistent with the vessel requiring immediate repairs at a port of refuge and then sailing for comprehensive repairs at a shipyard.

In some exemplary embodiments, the validation may be based on validating data that occurred at a time of the risk event. In some exemplary embodiments, the validating data may indicate that the vessel had a grounding event, such as by being in a location where the depth is shallower than the draught. In some cases, depth may be considered shallower than a draught if it is not above the draught by a minimal threshold. The draught may be determined based on the raw maritime data, such as based on AIS blips, based on extrapolated draught in view of loading and unloading of cargo, or the like.

Additionally or alternatively, the validation data may be blips indicating that the vessel retained its location at sea and not near a port for at least a minimal time duration. Such data may be indicative of a grounding event, where the vessel remains stuck. Additionally or alternatively, such data may be indicative of the vessel sinking or being sunk. In some exemplary embodiments, the vessel may report purposely anchoring. Absence of such reports, may be indicative of the risk event occurring, while an anchoring report may be indicative that the risk event did not occur.

Additionally or alternatively, the validation data may be a collision vector between the vessel and another vessel. Such collision vector may be identified from the raw maritime data and may be indicative of a collision event. Additionally or alternatively, a collision event may be reported by the second vessel, and such report may be used to validate the collision occurring for the vessel as well.

In some exemplary embodiments, Risk Event Identifier 130 may be configured to validate a claim in the Insurance Claims DB 106, or other risk events data source. The claim may indicate a risk event for a vessel at a predetermined time. Risk Event Identifier 130 may attempt to identify a pattern consistent with the risk event at the predetermined time. Risk Event Validator 140 may be configured to validate the risk event detected by Risk Event Identifier 130. Based on the determination, Insurance Claims DB 106 may be updated, such as to remove false claims, enrich existing claims, such as indicating the vessel with which the collision occurred, or include new events for which a claim was not filed, either at the present time or at all. In some exemplary embodiments, Insurance Claims DB 106 may be used as a data source and still be updated by System 100. Such configuration is non-conventional as it may either be assumed that the data source is credible or not. Instead, the disclosed subject matter may check each datum of the Insurance Claims DB 106 separately for credibility, while updating the database to improve it and provide a more complete and correct information about the vessels.

In some exemplary embodiments, Alert Generator 150 may be configured to issue an alert that is provided to a User 155, such as an analyst, a port authority officer, or the like. The alert may indicate real-time risk events that require actions in order to mitigate the risk therefrom. For example, the alert may indicate that a collision had just occurred, and User 155 may be prompted to launch a rescue party to the location of the collision. Additionally or alternatively, the rescue party may be launched automatically without input from User 155, or may be launched after User 155 manually approves it. Additionally or alternatively, the alert may be generated in real-time based on partial raw maritime data available at that time. Additionally or alternatively, Alert Generator 155 may dispatch additional sensor means in order to obtain additional information, such as for example dispatching drones to film the area or the vessels, instruct a satellite to take photos of the area of interest, or the like.

Additionally or alternatively, a Resource Allocation Plan Module 160 may be configured to analyze the risk events and determine an optimal resource allocation plan to mitigate the risk therefrom. The allocation plan may be determined by automatically solving an optimization problem of minimizing expected damage from the risk events, of minimizing expected travel time of a resource to a risk event, of minimizing expected distance of a resource to a risk event, or the like. The resource allocation plan may indicate a location for each maritime asset, such as tugboats (165), coastguard ships (162), or the like. The plan may be implemented, and the maritime assets may be moved to adhere to the new plan. Data related to the implementation of the resource allocation plan may be fed into the analysis in a feedback loop to allow machine learning algorithms to perform better in future tasks.

Figure 2A:
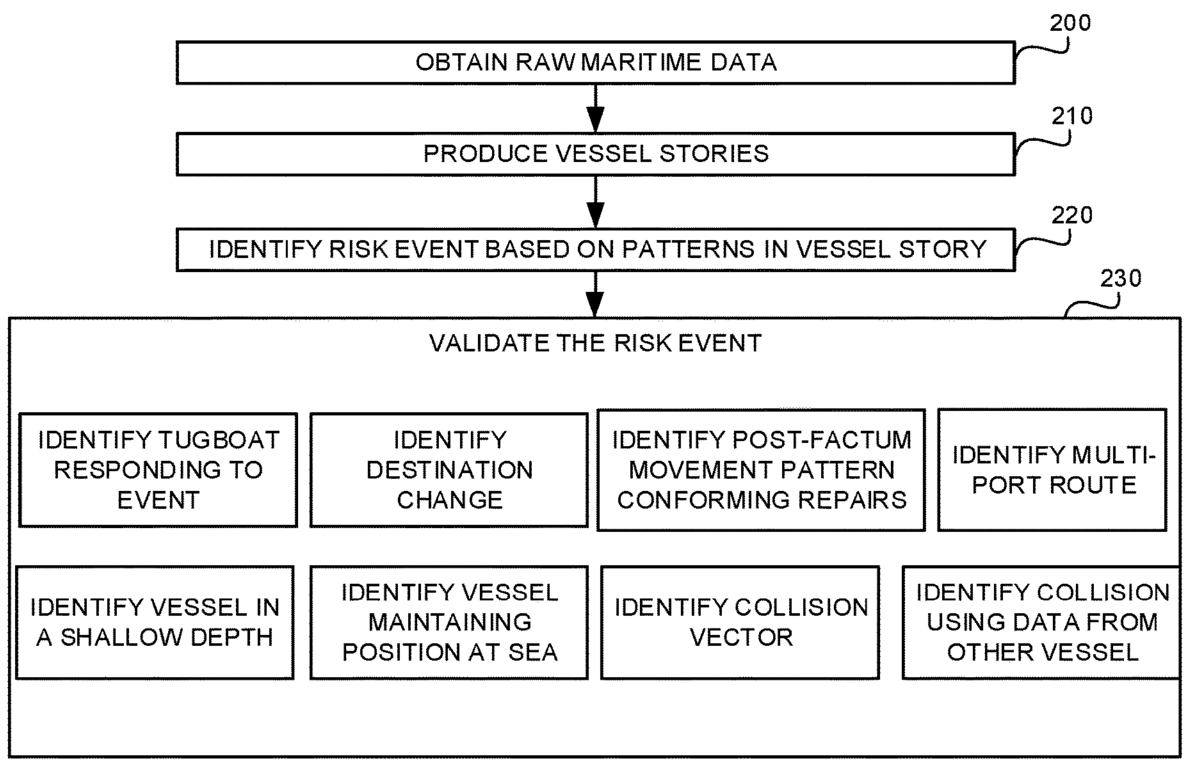

Referring now to FIG. 2A showing a flowchart diagram of a method, in accordance with some exemplary embodiments of the disclosed subject matter.

On Step 200, raw maritime data may be obtained. The raw maritime data may be obtained from a plurality of data sources, such as alternative vendors of data of the same type, external databases, such as insurance claims database, port database, agent's database, or the like, and so forth. The raw maritime data may be obtained by Raw Maritime Data Obtainer 110.

On Step 210, vessel stories may be produced or updated. In some exemplary embodiments, for each vessel, a vessel story may be produced. In some exemplary embodiments, for each vessel, activities may be identified and compiled into a single vessel story. In some cases, supervised learning may be utilized to predict, based on training data where activities are manually labeled, activity labels based on raw maritime data. In some cases, the supervised learning may be used to predict the activity based on raw maritime data and based on additional determined activities. In some exemplary embodiments, activities may be determined to generate a partial vessel story, and thereafter, based on the partial vessel story and the raw maritime data associated with timeframes for which activities were not yet identified, additional activities may be determined or existing activities may be validated or updated. In some exemplary embodiments, the vessel story may be iteratively generated based on a prefix of the vessel story that was previously determined using initial raw maritime data and based on additional data obtained after the determination of the prefix. The vessel stories may be produced by a Vessel Story Generator 120.

On Step 220, a risk event is identified. In some exemplary embodiments, the risk event is identified based on the activities in the vessel story of the vessel or of several vessels. The risk event may be identified based on an identification of a pattern in the vessel story that is consistent with a risk event. In some cases, the risk event may be identified using also raw maritime data in combination with the vessel story. The risk event may be identified by a Risk Event Identifier 130.

On Step 230, the risk event may be validated. Validation may be performed by a Risk Event Validator 140. The disclosed subject matter provides multiple examples of validation data that can be used to validate the risk event. The risk event may be validated using raw maritime data. Additionally, or alternatively, the risk event may be validated using one or more vessel stories. The validation data may be data representing events occurring after or obtained after the risk event. Additionally, or alternatively, the validation data may be data that is associated with the timestamp in which the risk event occurred.

In some exemplary embodiments, the validation data may be a tugboat responding to an event, a tugboat towing a vessel after the risk event, a destination change in the vessel, a post-factum movement pattern that confirms repairs, a multi-port route that is consistent with first aid repairs and later full repairs, or the like. Additionally, or alternatively, the validation data may comprise the vessel being located at a shallow location with respect to its draught, a vessel maintaining position at open sea or away from port, a collision vector occurring at the time of the risk event, collision report by another vessel or in the insurance claims database, information obtained from a risk events data source, or the like.

Figure 2B:
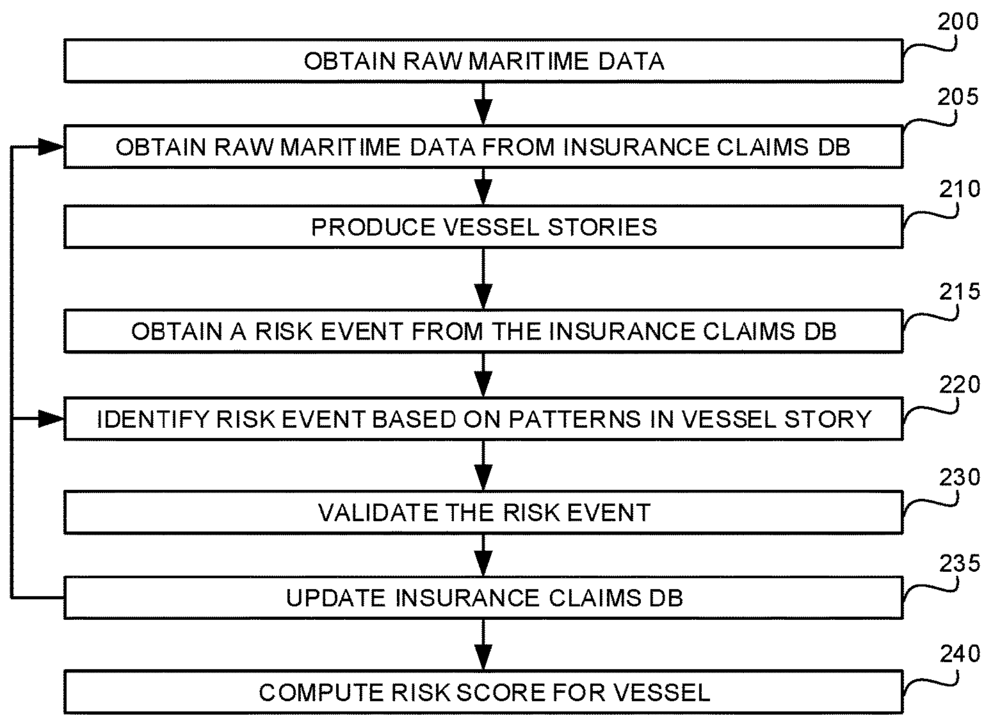

Referring now to FIG. 2B showing a flowchart diagram of a method, in accordance with some exemplary embodiments of the disclosed subject matter.

On Step 205, raw maritime data may be obtained from a risk events data source. In some exemplary embodiments, the data may be obtained from an insurance claims database, such as 106. The insurance claims database may indicate locations of vessels at specific times, and potential risk events that occurred to the vessels.

On Step 215, a risk event may be obtained from the insurance claims database. The risk event may be an event that was manually reported but not yet validated. The claim may be a claim being investigated or otherwise checked. On Steps 220-230, the reported risk event may be validated by identifying a pattern consistent with the reported risk event. Additionally, or alternatively, the reported risk event may be validated by the Risk Event Validator 140.

On Step 235, based on the validated risk event (or refuted risk event), the claims database may be updated. The insurance claims database may be enhanced to include an indication that the claim was validated automatically using objective data. Additionally, or alternatively, the insurance claims database may be updated to delete refuted claims. Additionally, or alternatively, the insurance claims database may be updated to update existing claims with enriched data, or insert new unreported claims based on the risk event. The unreported claims may be potential claims that were not yet made. Such unreported claims may affect the risk factor of the vessel and may affect whether an insurer would like to insure the vessel. However, such information is not generally available, and the disclosed subject matter may provide for such information in a manner that is objective and automatic.

In some exemplary embodiments, some of the steps may be performed iteratively. Additionally or alternatively, after a risk event is validated in Step 230 or after the insurance claims database is updated accordingly, additional risk events may be identified and validated (Steps 220-230). Additionally or alternatively, after the insurance claims database is updated, the raw maritime data may be updated accordingly and Steps 205-235 may be performed. In some cases, vessel stories may be recomputed in Step 210 only with respect to raw maritime data that had changed. For example, of the data is updated with respect to one vessel, vessel stories of other vessels may remain unaffected and no re-computation may be performed with respect thereto. As another example, if the data is modified with respect to a time-window, the vessel story may be recomputed only with respect to the time-window. In some cases, after the time-window is processed, additional ramifications to other points in time may be determined and the vessel story may be updated accordingly in portions outside the time-window.

On Step 240, one or more risk scores for each vessel may be computed. A risk score may be computed based on the risk events, their timing, their severity, the potential and actual damage, maintenance schedule, or the like. In some cases, a risk score may be computed based on the locations where the vessel is traveling, based on a manner of travel (e.g., quality of sailing, as reviewed from the plot of the vessel and the metadata thereof), or the like.

Figure 2C:
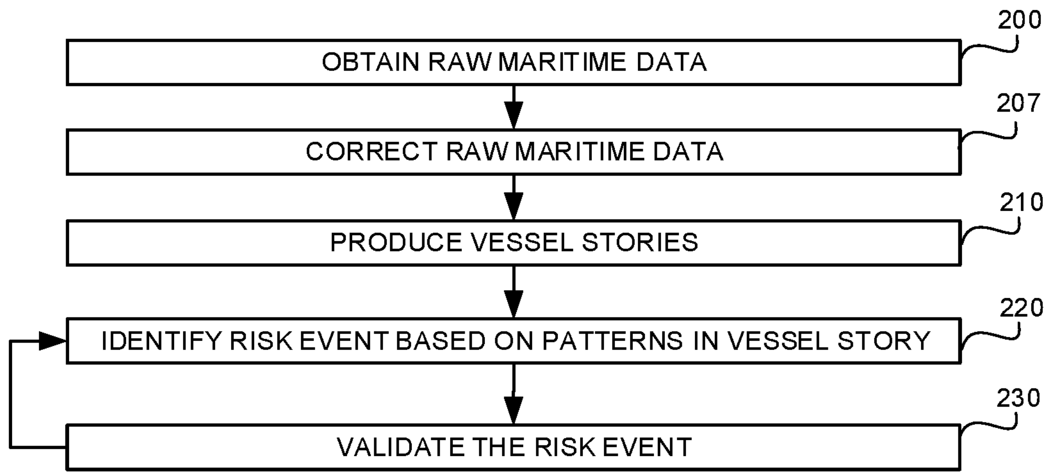

Referring now to FIG. 2C showing a flowchart diagram of a method, in accordance with some exemplary embodiments of the disclosed subject matter.

On Step 207, raw maritime data may be corrected. The raw maritime data may be corrected such as by matching raw data to a vessel. For example, AIS blips appearing as being associated with the same MMSI identifier may be matched to different vessels. Different records may be fused together to create an augmented record comprising data obtained from different instances thereof, so as the augmented record may provide data not available by either one of the different records alone. In some exemplary embodiments, the raw maritime data may be corrected based on rules relating to the data source. For example, a vendor that uses a satellite, may have a predetermined offset in its reported location or time, which may be accounted for to determine the correct location or time. Additionally, or alternatively, certain vendors may be more vulnerable to certain types of corruption, and correction codes may be used to correct the corrupted data.

Figure 2D:
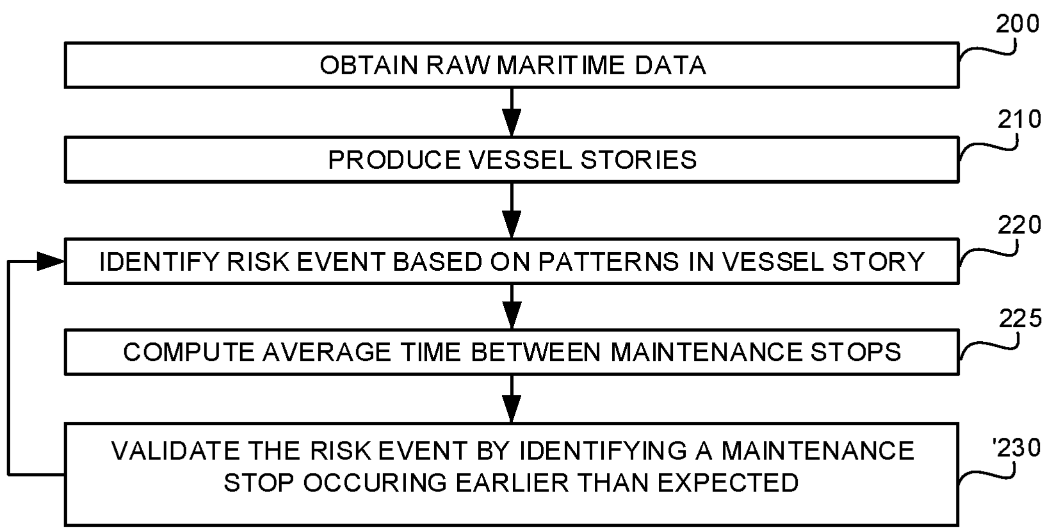

Referring now to FIG. 2D showing a flowchart diagram of a method, in accordance with some exemplary embodiments of the disclosed subject matter.

On Step 225, a statistical measurement relating to time durations between maintenance may be computed. The statistical measurement may comprise, for example, an average time duration, mean time duration, common time duration, or the like. The statistical measurement may comprise a measurement for measuring deviation, such as standard deviation.

In some cases, if the deviation from the norm as represented by the statistical measurement is above a threshold, and the deviation is in observing a shorter duration than expected, then it may be determined that unscheduled maintenance was performed. On step '230, unscheduled maintenance may be utilized to validate the risk event. The maintenance may be performed in response to the occurrence of the risk event, and as a result, the occurrence of an earlier than expected maintenance stop may be useful in validating the occurrence of the risk event.

Figure 2E:
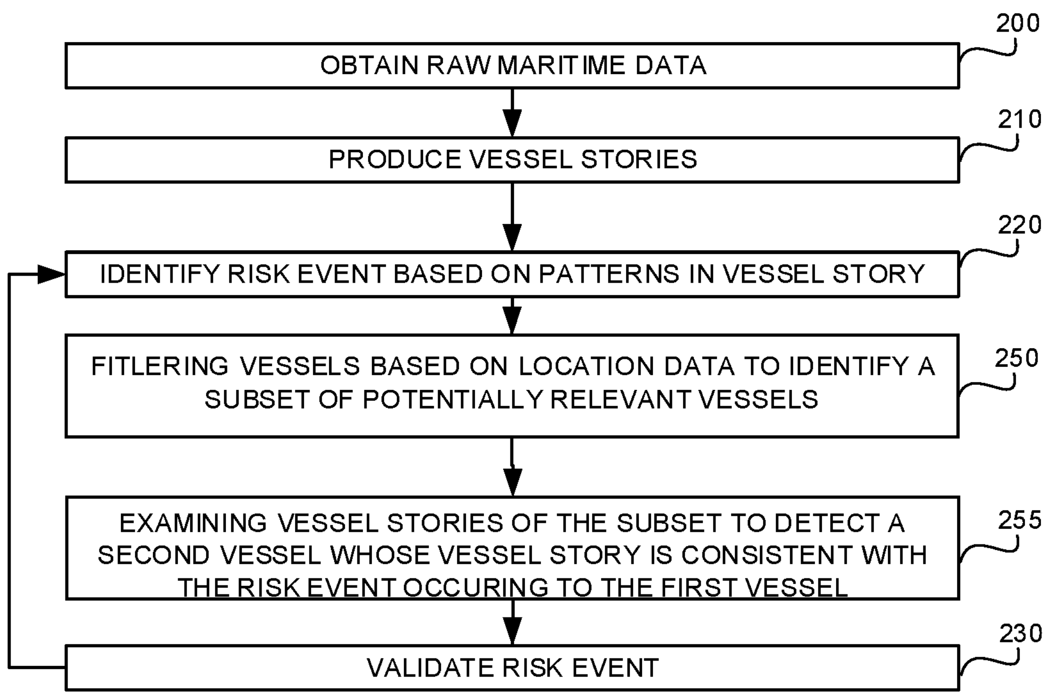

Referring now to FIG. 2E showing a flowchart diagram of a method, in accordance with some exemplary embodiments of the disclosed subject matter.

On Step 250, a subset of vessels that are potentially relevant to the risk event of a first vessel may be determined. The subset may be determined by filtering vessels based on their location during a timeframe. The timeframe may include the time of the risk event. Additionally, or alternatively, the timeframe may begin at the time of the risk event and ending at a time succeeding the time of the risk event, such as one hour after the risk event, one day after the risk event, or the like. Vessels that were not located in proximity of the first vessel during the timeframe may be filtered and indicated not part of the subset. Additionally, or alternatively, vessels that were not located in proximity to the risk event may be filtered and ruled out as being potentially relevant to the rule event. For example, it may be determined which of the vessels were in a 3 km radius from the location of the risk event or from the location of the first vessel, within the timeframe. Additionally or alternatively, a spatio-temporal index may be utilized to perform the filtration. In some exemplary embodiments, the filtration may be performed using the raw maritime data and not using the vessel story, which may not necessarily provide the first vessel's location at the relevant timeframe. Hence, instead of using the vessel story that comprises a reduced amount of data, the raw maritime data is used for the filtration. In some exemplary embodiments, the subset of vessels that were identified as potentially relevant may be examined using their more compact representation of data, e.g., vessel stories.

On Step 255, the vessel stories of the subset of vessels may be examined to detect a second vessel whose vessel story is consistent with the risk event occurring to the first vessel. Such second vessel may be useful in validating the risk event occurring to the first vessel. For example, the second vessel may include in its vessel story a collision event with the first vessel. As another example, the second vessel may respond to the risk event and assist the first vessel thereafter, as may be reflected by the vessel story of the second vessel.

Figure 2F:
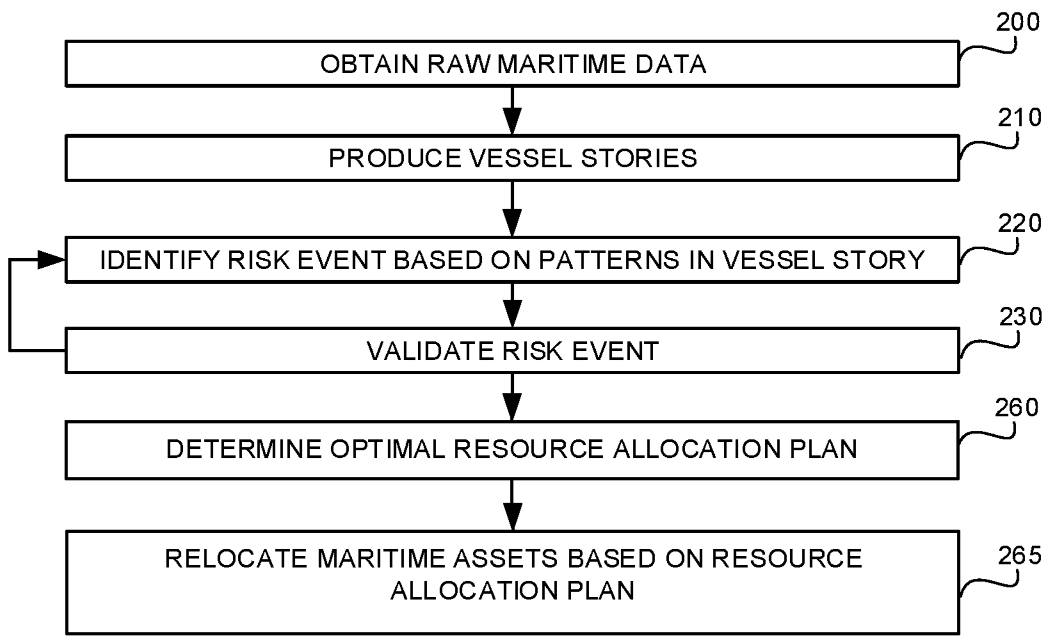

Referring now to FIG. 2F showing a flowchart diagram of a method, in accordance with some exemplary embodiments of the disclosed subject matter.

Steps 220-230 may be performed iteratively to identify all risk events based on the dataset available to the system. The set of risk events of the different vessels may be utilized, such as in computing risk scores for each vessel (not shown). Additionally, or alternatively, the risk events may be useful for determining resource allocation plan.

On Step 260, an optimal resource allocation plan may be determined. The resource allocation plan may be determined by solving an optimization problem of positioning maritime assets that are used in response to risk events in a manner that minimizes a cost function. The cost function may be a damage caused by the risk event, which is mitigated by the maritime assets reaching the location of the risk event quickly. Additionally, or alternatively, the cost function may be a travel time or travel distance between the closest maritime asset to the risk event and the risk event. Alternative positioning of the maritime assets may be examined, to identify a position yielding the minimal value for the cost function.

The resource allocation plan may indicate for each maritime resource its new location in which the resource is positioned. The plan may be implemented (Step 265), and the resources may be moved to the determined location according to such plan. In some exemplary embodiments, in view of the new resource allocation plan, the overall efficiency of the fleet of maritime resources may be improved. In some cases, the fleet may operate better and reduce expected damage from potential risk events that occur to vessels, such as vessels associated with the fleet (e.g., a navy fleet that comprises vessels and maritime resources), vessels in the territorial water of a country (e.g., a fleet of vessels that are used to mitigate the risk to vessels while being in the territorial water of a country), or the like. In some cases, the fleet may operate better and reduce expected damage to other entities, to the environment (e.g., oil spills), or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:

a memory, wherein said memory retaining raw maritime data, wherein the raw maritime data is indicative of a geolocation of vessels at different times, wherein the raw maritime data comprises duplicative data obtained from separate sources;

a processor configured to:

analyze the raw maritime data to produce for each vessel a vessel story, wherein the vessel story comprises a set of activities and corresponding timestamps, wherein the set of activities are deduced from the raw maritime data, wherein the set of activities associated with the each vessel is smaller by at least one order of magnitude than the raw maritime data associated with the each vessel;

identify a pattern in the vessel story associated with a first vessel, wherein the pattern conforms with a risk event; and validate the risk event using the raw maritime data or using one or more vessel stories, whereby identifying the risk event using reduced resources in comparison with resources required to identify the risk event in the raw maritime data, and without increasing false positive metrics.

2. The apparatus of claim 1, wherein the raw maritime data is obtained from a plurality of sources, wherein the plurality of sources comprises a risk events data source, wherein said processor is further configured to update the risk events data source based on the validated risk event.

3. The apparatus of claim 2, wherein the risk events data source is an insurance claims database, wherein said processor is further configured to obtain the risk event from the insurance claims database, wherein said identify the pattern and said validate the risk event are performed to validate the risk event appearing in the insurance claims database.

4. The apparatus of claim 1, wherein said validating the risk event comprises: using validating data occurring after the risk event had occurred.

5. The apparatus of claim 4, wherein the validating data comprises at least one of the following:

one or more tugboats reaching the first vessel and moving together with the first vessel to a destination;

a destination change to a location where the first vessel can be repaired;

a movement pattern conforming with repairing the first vessel; and a multi-port route, wherein the multi-port route comprises visiting a port and a shipyard thereafter, wherein the port is closer to a location of the risk event than the shipyard.

6. The apparatus of claim 1, wherein said validating the risk event comprises: using validating data occurring at a time of the risk event.

7. The apparatus of claim 6, wherein the validating data comprises the first vessel being located in a location where a depth is shallower than a draught of the first vessel, wherein the draught of the first vessel is determined based on the raw maritime data.

8. The apparatus of claim 6, wherein the validating data comprises the first vessel maintaining position at sea for a minimal time threshold.

9. The apparatus of claim 8, wherein the raw maritime data does not indicate the first vessel anchoring when maintaining position at sea.

10. The apparatus of claim 6, wherein the validating data comprises a collision vector between the first vessel and a second vessel.

11. The apparatus of claim 10, wherein the validating data comprises an indication of a collision from the second first vessel.

12. The apparatus of claim 1, wherein the raw maritime data is exclusive of data for the first vessel at a time of the risk event, whereby raw maritime data from before and after the risk event is utilized to identify the risk event.

13. The apparatus of claim 1, wherein the processor is further configured to determine a resource allocation plan and send the resource allocation plan for execution, wherein the resource allocation plan comprises a plan to distribute maritime assets associated with risk events; whereby physical location of the maritime assets is changed.

14. The apparatus of claim 1, wherein the raw maritime data is obtained from a plurality of sources, wherein the plurality of sources comprises a first Automatic Identification System (AIS) vendor and a second AIS vendor.

15. The apparatus of claim 1, wherein the processor is further configured to compute a risk score for the first vessel based on automatically determined risk events of the first vessel.

16. The apparatus of claim 1, wherein the raw maritime data comprises a first raw data and a second raw data, wherein the first and second raw data comprise an identifier of a same maritime object, wherein said processor is configured to match the first raw data with the first vessel and the second raw data with a second vessel.

17. The apparatus of claim 1, wherein said processor is further configured to compute, based on the vessel story of the first vessel, a statistical measurement of maintenance stops performed by the first vessel, wherein validating the risk event comprises identifying a maintenance stop occurring after the risk event and prior to an expected maintenance stop in view of the statistical measurement.

18. A method comprising:

obtaining raw maritime data from a plurality of sources, wherein the raw maritime data is indicative of a geolocation of vessels at different times, wherein the raw maritime data comprises duplicative data obtained from separate sources;

analyzing the raw maritime data to produce for each vessel a vessel story, wherein the vessel story comprises a set of activities and corresponding timestamps, wherein the set of activities are deduced from the raw maritime data, wherein the set of activities associated with the each vessel is smaller by at least one order of magnitude than the raw maritime data associated with the each vessel;

identifying a pattern in the vessel story associated with a first vessel, wherein the pattern conforms with a risk event; and validating the risk event using the raw maritime data or one or more vessel stories;

whereby identifying the risk event using reduced resources in comparison with resources required to identify the risk event in the raw maritime data without increasing false positive metrics.

19. The method of claim 18, wherein the raw maritime data is obtained from a plurality of sources, wherein the plurality of sources comprises an insurance claims database, wherein said method further comprises updating the insurance claims database based on the validated risk event.

20. The method of claim 18, wherein said validating the risk event comprises: using validating data occurring after the risk event had occurred, wherein the validating data comprises at least one of the following:

one or more tugboats reaching the first vessel and moving together with the first vessel to a destination;

a destination change to a location where the first vessel can be repaired;

a movement pattern conforming with repairing the first vessel; and a multi-port route, wherein the multi-port route comprises visiting a port and a shipyard thereafter, wherein the port is closer to a location of the risk event than the shipyard.

21. The method of claim 18, wherein said validating the risk event comprises at least one of:

identifying the first vessel being located in a location where a depth is shallower than a draught of the first vessel at a time of the risk event, wherein the draught of the first vessel is determined based on the raw maritime data;

identifying that the first vessel maintaining position at sea for a minimal time threshold at a time of the risk event;

identifying a collision vector between the first vessel and a second vessel; and obtaining an indication of a collision from raw maritime data associated with the second vessel.

22. The method of claim 18, wherein the raw maritime data is exclusive of data for the first vessel at a time of the risk event, whereby raw maritime data from before and after the risk event is utilized to identify the risk event.

23. The method of claim 18 further comprises:

determining a resource allocation plan, wherein the resource allocation plan comprises a plan to distribute maritime assets associated with risk events;

implementing the resource allocation plan, whereby physical location of the maritime assets is changed.

24. The method of claim 18, wherein the raw maritime data comprises a first raw data and a second raw data, wherein the first and second raw data comprise an identifier of a same maritime object, wherein said method comprises matching the first raw data with the first vessel and matching the second raw data with a second vessel.

25. The method of claim 18 further comprises computing, based on the vessel story of the vessel, a statistical measurement of maintenance stops performed by the vessel, wherein said validating the risk event comprises identifying a maintenance stop occurring after the risk event and prior to an expected maintenance stop in view of the statistical measurement.

26. A method comprising:

obtaining raw maritime data from a plurality of sources, wherein the raw maritime data is indicative of a geolocation of vessels at different times, wherein the raw maritime data comprises duplicative data obtained from separate sources;

analyzing the raw maritime data to produce for each vessel a vessel story, wherein the vessel story comprises a set of activities and corresponding timestamps, wherein the set of activities are deduced from the raw maritime data, wherein the set of activities associated with the each vessel is smaller by at least one order of magnitude than the raw maritime data associated with the each vessel;

identifying a pattern in the vessel story associated with a first vessel, wherein the pattern conforms with a risk event; and validating the risk event using the vessel story associated with a second vessel, wherein the second vessel story is consistent with the risk event occurring to the first vessel;

whereby identifying the risk event using reduced resources in comparison with resources required to identify the risk event in the raw maritime data without increasing false positive metrics.

27. The method of claim 26, wherein said validating comprises detecting a second vessel story consistent with a collision between the first vessel and the second vessel.

28. The method of claim 26, wherein said validating comprises detecting a second vessel story consistent with the second vessel towing the first vessel after the risk event occurred.

29. The method of claim 26, wherein according to the raw maritime data the first and the second vessel are located in proximity to one another at a time of the risk event or within a time window thereafter.

30. The method of claim 26, wherein said validating comprises:

filtering from the plurality of vessels a subset of vessels, wherein the subset of vessels are vessels that at the time of the risk event or within a time window thereafter are located in proximity to the first vessel;

examining vessel stories of each vessel in the subset of vessels to detect the second vessel, whereby checking consistency of vessel stories with the risk event occurring to the first vessel for a reduced number of vessels, whereby reducing computational resources required for said validating.

31. A non-transitory computer readable medium retaining program instructions, which program instructions when read by a processor, cause the processor to perform a method comprising:

obtaining raw maritime data from a plurality of sources, wherein the raw maritime data is indicative of a geo-location of vessels at different times, wherein the raw maritime data comprises duplicative data obtained from separate sources;

analyzing the raw maritime data to produce for each vessel a vessel story, wherein the vessel story comprises a set of activities and corresponding timestamps, wherein the set of activities are deduced from the raw maritime data, wherein the set of activities associated with the each vessel is smaller by at least one order of magnitude than the raw maritime data associated with the each vessel;

identifying a pattern in the vessel story associated with a first vessel, wherein the pattern conforms with a risk event; and validating the risk event using the raw maritime data or one or more vessel stories;

whereby identifying the risk event using reduced resources in comparison with resources required to identify the risk event in the raw maritime data without increasing false positive metrics.

* * * * *